US008721095B2

(12) United States Patent
Braesch et al.

(10) Patent No.: US 8,721,095 B2
(45) Date of Patent: May 13, 2014

(54) ATTACHABLE UNDER-BEZEL TABS FOR DISPLAY COVERS

(75) Inventors: Keith Twain Braesch, Orange, CA (US); Tina Lee Huff, Laguna Niguel, CA (US)

(73) Assignee: Targus Group International, Inc., Anaheim, CA (US)

(*) Notice: Subject to any disclaimer, the term of this patent is extended or adjusted under 35 U.S.C. 154(b) by 89 days.

(21) Appl. No.: 13/328,577

(22) Filed: Dec. 16, 2011

(65) Prior Publication Data
US 2013/0156999 A1    Jun. 20, 2013

(51) Int. Cl.
G02B 27/00    (2006.01)
(52) U.S. Cl.
USPC ............................ 359/609; 359/601
(58) Field of Classification Search
USPC .................................. 359/601–612
See application file for complete search history.

(56) References Cited

U.S. PATENT DOCUMENTS

| | | | | |
|---|---|---|---|---|
| 3,582,189 | A * | 6/1971 | Moritz et al. | 359/613 |
| 4,427,264 | A * | 1/1984 | Kamerling | 359/601 |
| 6,219,127 | B1 * | 4/2001 | Hirakata et al. | 349/153 |
| 6,680,096 | B1 * | 1/2004 | Junghans et al. | 428/40.1 |
| 6,750,922 | B1 * | 6/2004 | Benning | 348/818 |
| 6,832,445 | B2 * | 12/2004 | Pitzen | 40/594 |
| 7,452,142 | B1 * | 11/2008 | Smith | 396/422 |
| 7,506,450 | B2 * | 3/2009 | Spaulding et al. | 33/286 |
| 2003/0133207 | A1 * | 7/2003 | Minami et al. | 359/885 |
| 2003/0173246 | A1 * | 9/2003 | Weder et al. | 206/423 |
| 2004/0109096 | A1 * | 6/2004 | Anderson et al. | 348/832 |
| 2005/0094362 | A1 * | 5/2005 | Stephens | 361/681 |
| 2009/0283438 | A1 | 11/2009 | Bourque | |
| 2010/0075102 | A1 * | 3/2010 | Lev et al. | 428/99 |
| 2010/0142864 | A1 * | 6/2010 | Czarny | 383/207 |

FOREIGN PATENT DOCUMENTS

EP    1 127 015 B1    9/2004

OTHER PUBLICATIONS

International Search Report and Written Opinion for PCT/US2012/063509 filed Nov. 5, 2012, and mailed from the International Searching Authority on Mar. 18, 2013, 9 pgs.

* cited by examiner

*Primary Examiner* — Thong Nguyen
(74) *Attorney, Agent, or Firm* — John R. Thompson; Stoel Rives LLP

(57) ABSTRACT

According to various embodiments, selectively attachable under-bezel tabs include an adhering portion and a securing portion. An adhesive may be used to secure the adhering portion adjacent the edge of a display cover. The securing portion may be secured between a display surface and a display bezel. Accordingly, one or more under-bezel tabs may be adhered to a display cover in order to secure the display cover in front of a display. The display cover may be configured to protect or enhance the display. For example, a display cover may be configured to reduce glare or provide a privacy screen. The selectively attachable under-bezel tabs may be adhered to any of a wide variety of universal display covers, thereby adapting the universal display cover for use with displays configured with slotted bezels adapted to receive specialized display covers.

22 Claims, 16 Drawing Sheets

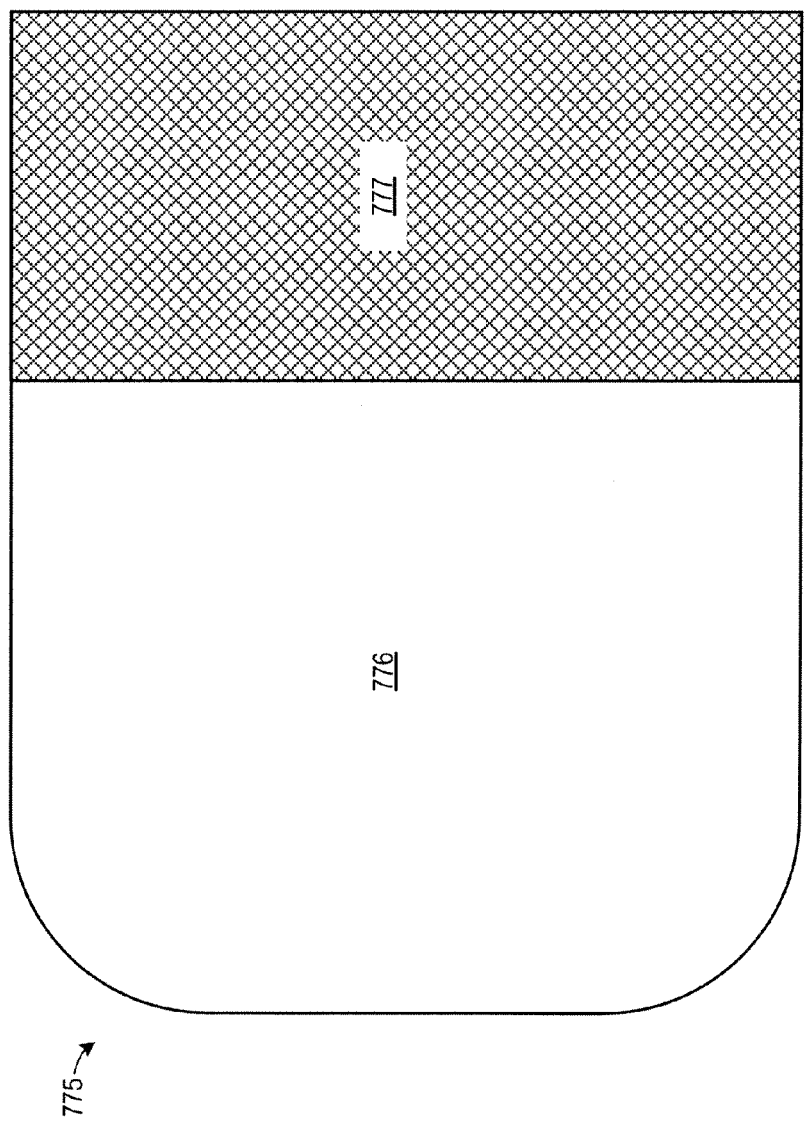
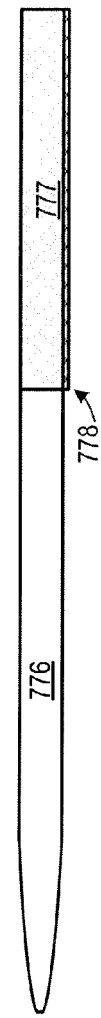
FIG. 7A
FIG. 7B

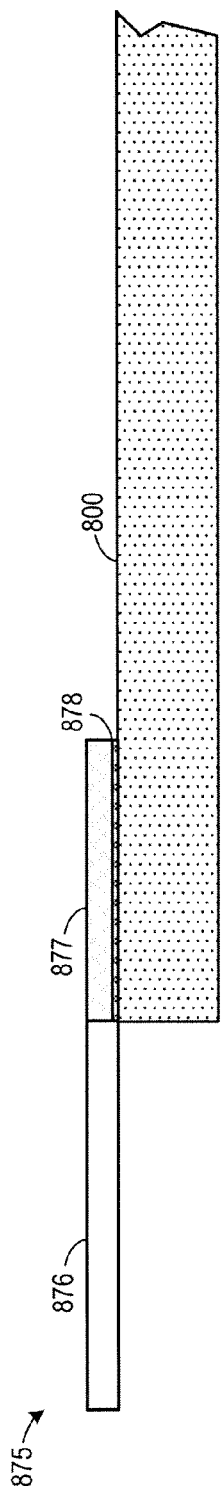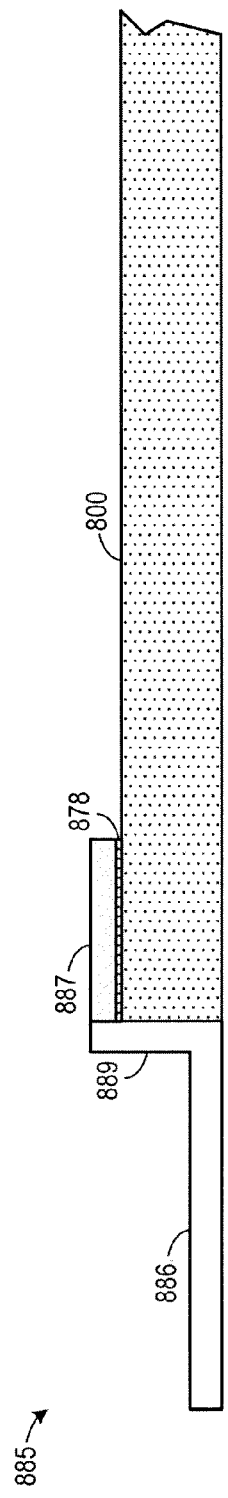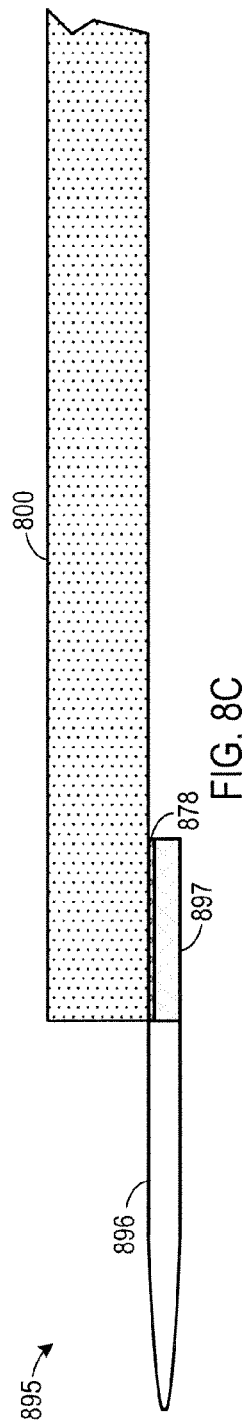

ATTACHABLE UNDER-BEZEL TABS FOR DISPLAY COVERS

TECHNICAL FIELD

This disclosure generally relates to covers, such as privacy filters and anti-glare filters, for display screens. Specifically, this disclosure relates to systems and methods for securing display covers to a display screen.

BRIEF DESCRIPTION OF THE DRAWINGS

Non-limiting and non-exhaustive embodiments of the disclosure are described, including various embodiments of the disclosure with reference to the figures, in which:

FIG. 7A illustrates a bottom view of a tapered under-bezel tab, including a securing portion and an adhering portion, according to one exemplary embodiment.

FIG. 7B illustrates a side profile view of the tapered under-bezel tab, according to one exemplary embodiment.

FIG. 8A illustrates a side profile view of an exemplary under-bezel tab secured to the top surface of a display cover.

FIG. 8B illustrates a side profile view of an alternative, step-down under-bezel tab secured to the top surface of a display cover.

FIG. 8C illustrates a side profile view of a tapered under-bezel tab secured to the bottom surface of a display cover.

Figure 1:
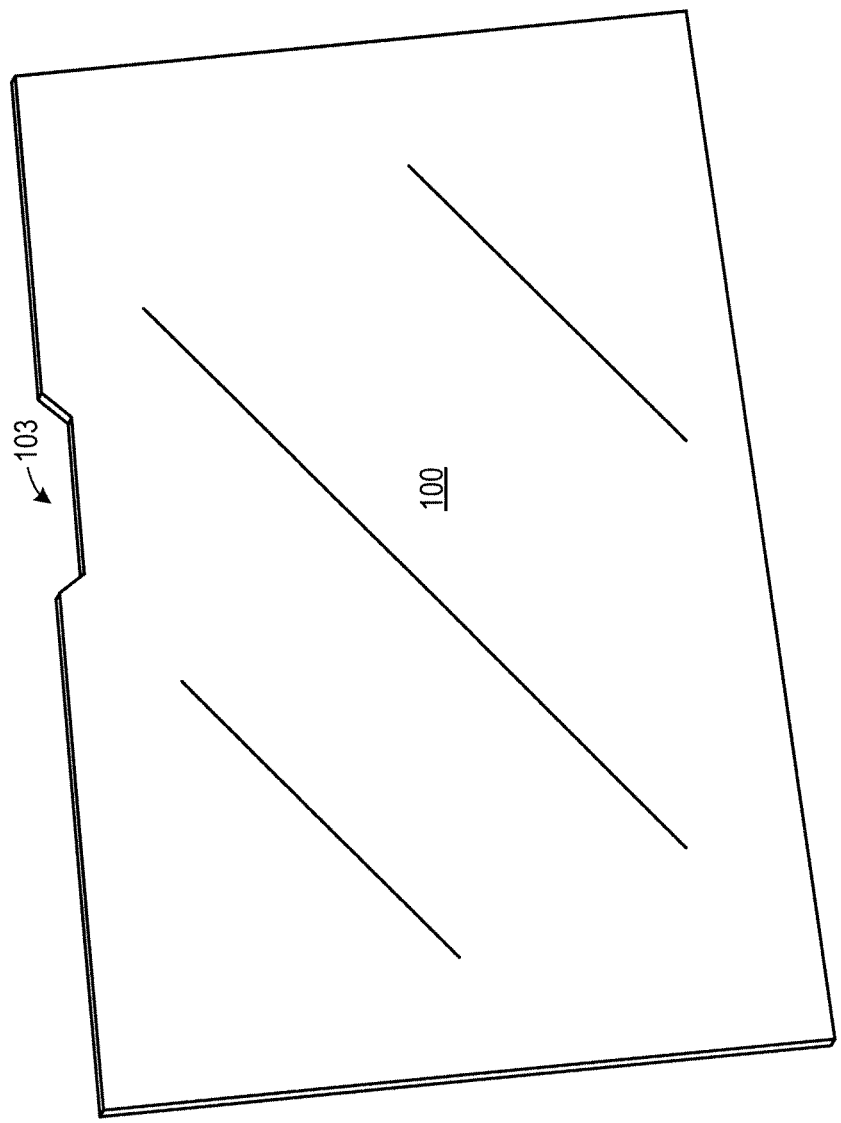
FIG. 1 illustrates an exemplary display cover configured to cover a display of an electronic device.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

BRIEF SUMMARY

The present disclosure describes an apparatus for securing a display cover to a display. The apparatus may include one or more under-bezel tabs configured to selectively secure a display cover to a display. Each under-bezel tab may include a first end configured to be selectively adhered adjacent an edge of the display cover and a second end configured to be secured between a display surface of the display and a bezel of the display. An adhesive may be configured to selectively adhere the first end of the under-bezel tab adjacent the edge of the display cover.

DETAILED DESCRIPTION

The present disclosure provides various embodiments of selectively attachable under-bezel tabs configured to secure a display cover to a display. According to various embodiments, display covers may be secured to a display of a laptop computer, television, computer monitor, and/or other electronic display device. A display cover may be configured to protect the display, shift a color of the display, dim the display, polarize the display, provide an anti-glare surface for the display, provide a privacy screen for the display, and/or otherwise modify or protect the display screen. Such display covers may be secured to a display using static or adhesives. In other embodiments, the display covers may be secured to a bezel of the display. For example, a clamp, suction cup, Velcro, a fastener, and/or an adhesive may be used to permanently or temporarily secure a display cover to a display.

In various embodiments, a display cover may include dimensions specifically adapted for a particular display. Additionally, one or more notches or cutouts may be formed in the display cover to facilitate positioning and handling. In various embodiments, multiple display covers may be utilized in conjunction with a single display.

According to various embodiments of the present disclosure, selectively attachable under-bezel tabs may include a securing portion and an adhering portion. The adhering portion of an under-bezel tab may be selectively adhered or otherwise attached adjacent an edge of a display cover. The securing end may then be positioned beneath the bezel of a display. Alternatively, the securing end may then be positioned within slots formed in the bezel of a display. Accordingly, one or more under-bezel tabs may be adhered to a generic display cover in order to allow the display cover to be unobtrusively secured to a display. For example, a generic privacy screen, that would otherwise require being secured to the outside bezel of a display, may be unobtrusively secured beneath the bezel of a display, or within pre-formed slots in the bezel of a display.

In some embodiments, the under-bezel tabs may be configured to secure a display cover under any edge of a bezel of a display. In other embodiments, the under-bezel tabs may be configured to secure a display cover within pre-formed slots in a bezel of a display. Additionally, in various embodiments, the adhesive used to secure the adhering portion of an under-bezel tab to a display cover may be transparent.

A "display" as used throughout the specification may include any of a wide variety of active or passive electronic visual displays, or portions thereof. Specifically contemplated and illustrated are the display screens of laptop computers and desktop monitors, including those utilizing plasma, LCD, LED, OLED, E-Ink, and related technologies. However, the term "display" also includes, but is not limited to, the visual displays of electronic readers, tablet computers, tablet PCs, cellular phones, interactive displays, video displays, touch screens, touch computers, and the like.

Throughout this specification the term "adhesive" and "adhere" may refer to any of a wide variety of substances and/or methods for joining two components or materials. As used herein, an adhesive may be used to adhere two components or materials to one another permanently, semi-permanently, for a fixed time period, or temporarily. Any of a wide variety of adhesives may be used, including solvent based adhesives, polymer dispersion adhesives, emulsion adhesives, contact adhesives, hot adhesives, and pressure sensitive adhesives. For example, a removable pressure sensitive adhesive may be employed that could allow an under-bezel tab to be selectively removed from a display cover months or even years after its initial adhesion.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. As may be appreciated by one of skill in the art, characteristics and alternatives described in conjunction with one embodiment may be equally applicable to other embodiments, even if not explicitly stated.

In the following description, numerous details are provided to give a thorough understanding of various embodiments; however, the embodiments disclosed herein can be practiced without one or more of the specific details, or with other methods, components, materials, etc. In some instances, well-known structures, materials, or operations are not shown or described in detail to avoid obscuring aspects of this disclosure. It is understood that any of a wide variety of materials and manufacturing methods may be used to produce the various components of the presently described display covers and under-bezel tabs. Similarly, a wide variety of adhesives and securing mechanisms may be employed.

FIG. 1 illustrates a display cover 100 according to various embodiments. As illustrated, display cover 100 may include a notch 103 to facilitate user handling. Display cover 100 may be configured with any shape, size, or thickness to accommodate any of a wide variety of displays. In the illustrated embodiments, display cover 100 is configured with dimensions suitable for a computer display, such as the display of a laptop computer. In other embodiments, display cover 100 may be configured to accommodate a tablet computer display, a telephone display, a desktop computer display, or other electronic display.

Additionally, display cover 100 may be adapted to provide various protective and/or enhancement features to the display on which it is placed. For example, display cover 100 may be adapted to protect the display, shift a color of the display, dim the display, polarize the display, provide an anti-glare surface for the display, provide a privacy screen for the display, and/or otherwise modify or protect the display. In various embodiments, display cover 100 may be secured to a display using static, adhesives, and/or a fastener. For example, a clamp, suction cup, Velcro, a mechanical fastener, and/or an adhesive may be used to permanently or temporarily secure a display cover to a display. According to various embodiments of the present disclosure, display cover 100 may be secured to a bezel of the display using one or more selectively attachable under-bezel tabs.

Figure 2:
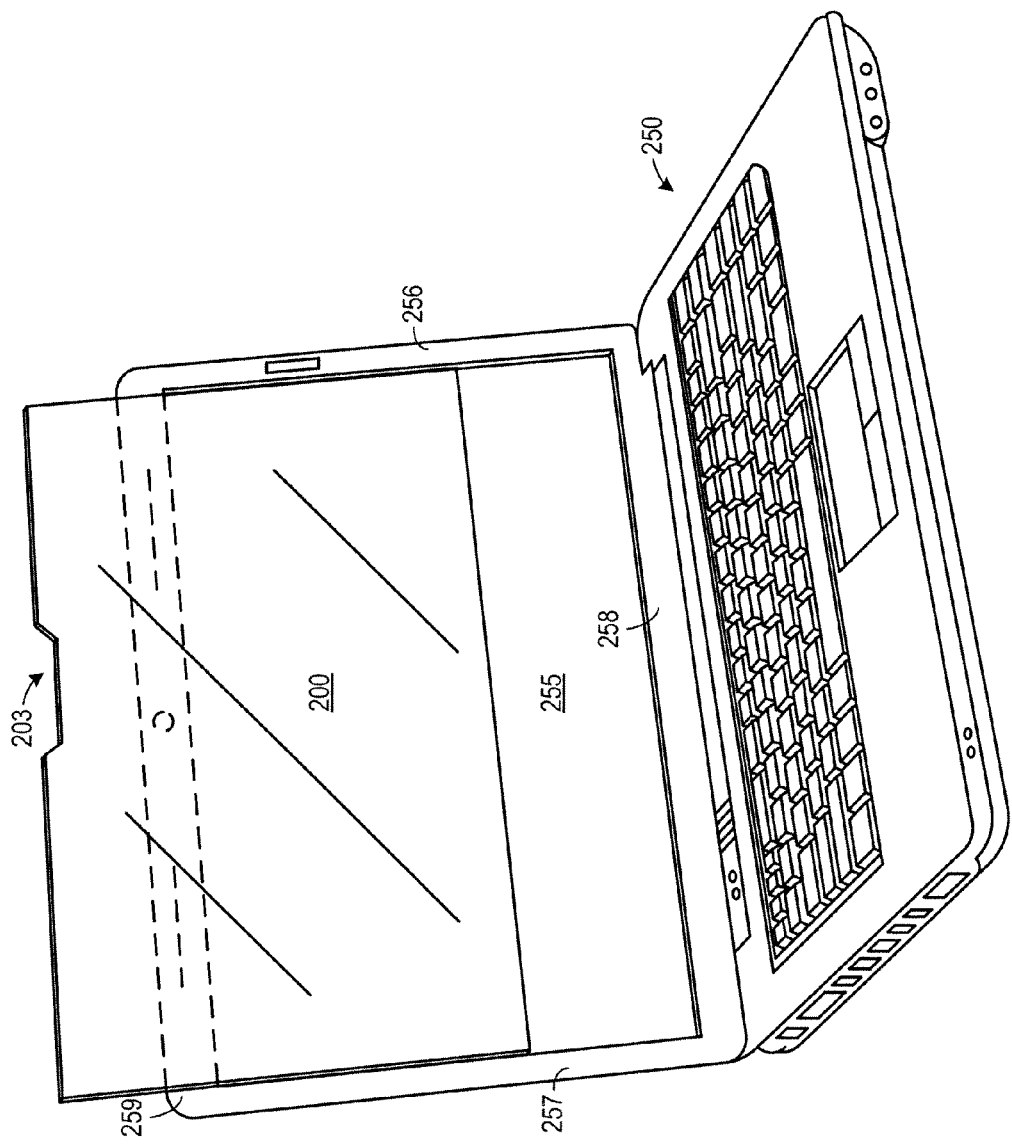
FIG. 2 illustrates an exemplary display cover as it is positioned on a display of a laptop computer.

FIG. 2 illustrates an exemplary display cover 200 as it is positioned in front of a display 255 of a laptop computer 250. Similar to the previously described embodiment, display cover 200 may include a notch 203 and be appropriately dimensioned to cover all or most of display 255. Display cover 200 may be configured to protect display 255, shift a color of display 255, act as a privacy screen for display 255, polarize display 255, dim display 255, and/or reduce glare from display 255.

As illustrated, display cover 200 may be slid along the face of display 255 and fit within the four bezel edges 256, 257, 258, and 259. According to various embodiments, display cover 200 may be secured to display 255 and/or one or more of bezels 256-259 via static, adhesives, and/or other fastener. For example, a clamp, suction cup, Velcro, a mechanical fastener, and/or an adhesive may be used to permanently or temporarily secure a display cover to a display. According to various embodiments of the present disclosure, display cover 200 may be secured to a bezel of the display 255 using one or more selectively attachable under-bezel tabs.

Figure 3A:
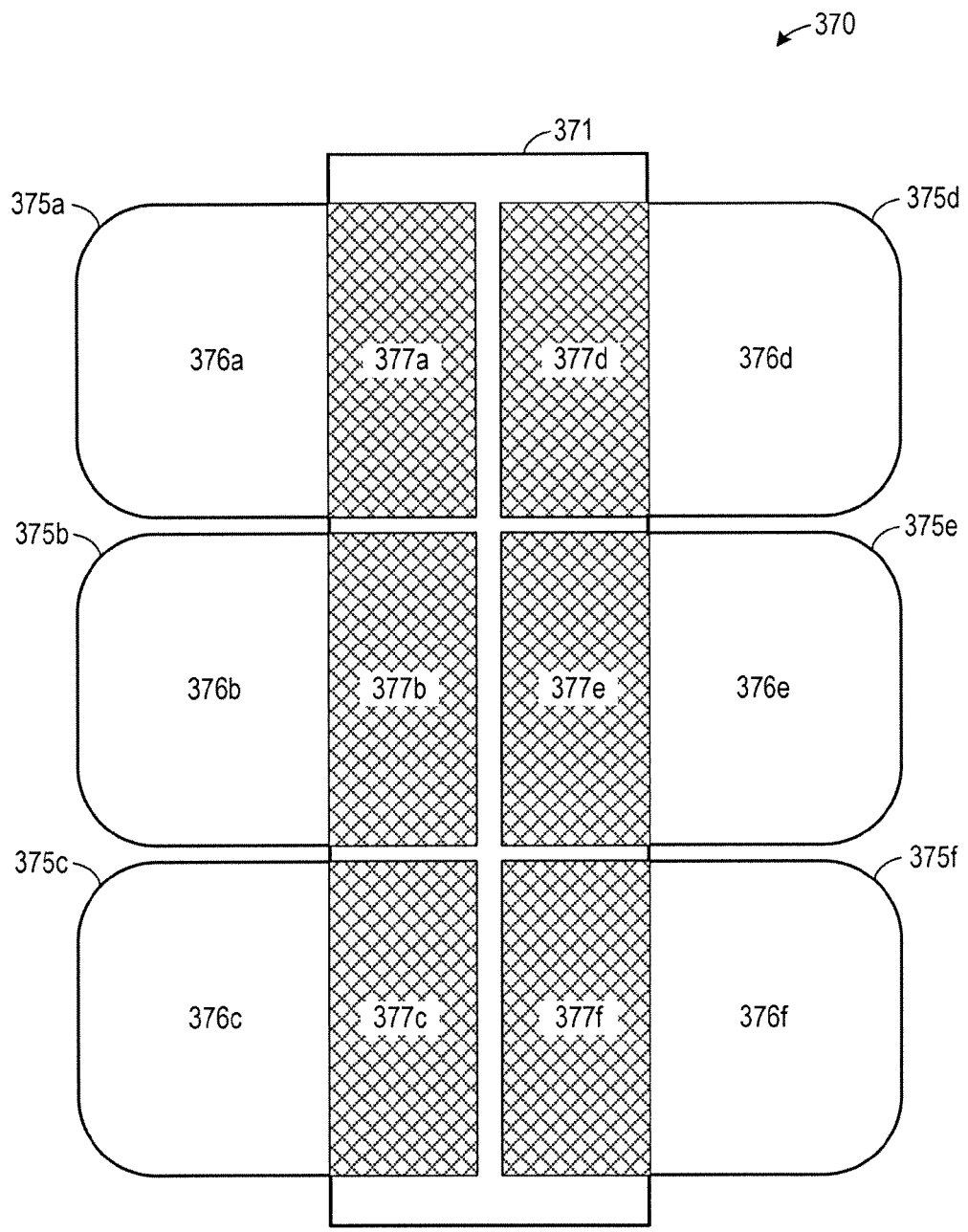
FIG. 3A illustrates a set of six attachable under-bezel tabs, according to one embodiment, one end of the under-bezel tabs configured to be attached to a display cover and the other end configured to be secured beneath a bezel of a display.

FIG. 3A illustrates a set 370 of six selectively attachable under-bezel tabs 375a-f, according to one embodiment. As illustrated, one end of each under-bezel tab 375a-f may include an adhering portion 377a-f configured to be attached to a display cover, such as the display cover 100 of FIG. 1. Another end of each under-bezel tab 375a-f may include a securing portion 376a-f configured to be secured beneath a bezel of a display. As illustrated, adhering portions 377a-f may be coated on an underside with an adhesive (illustrated in cross-hatches in FIG. 3A). Accordingly, adhering portions 377a-f may be placed on a release liner 371 prior to being adhered to a display cover.

The adhesive coating adhering portions 377a-f may comprise any of a wide variety of adhesives, including solvent based adhesives, polymer dispersion adhesives, emulsion adhesives, contact adhesives, hot adhesives, and pressure sensitive adhesives. For example, a removable pressure sensitive adhesive may allow a protective film to be selectively removed days, months, or even years after its initial adhesion to a display cover. Depending on the surface of the display cover and/or the type of adhesive utilized, under-bezel tabs 375a-f may be adhered to a top or bottom surface of a display cover permanently, semi-permanently, for a fixed time period, or temporarily. Moreover, the adhesive may be configured as a single-use adhesive, or as a reusable adhesive, allowing under-bezel tabs 375a-f to be removed and replaced as desired.

Figure 3B:
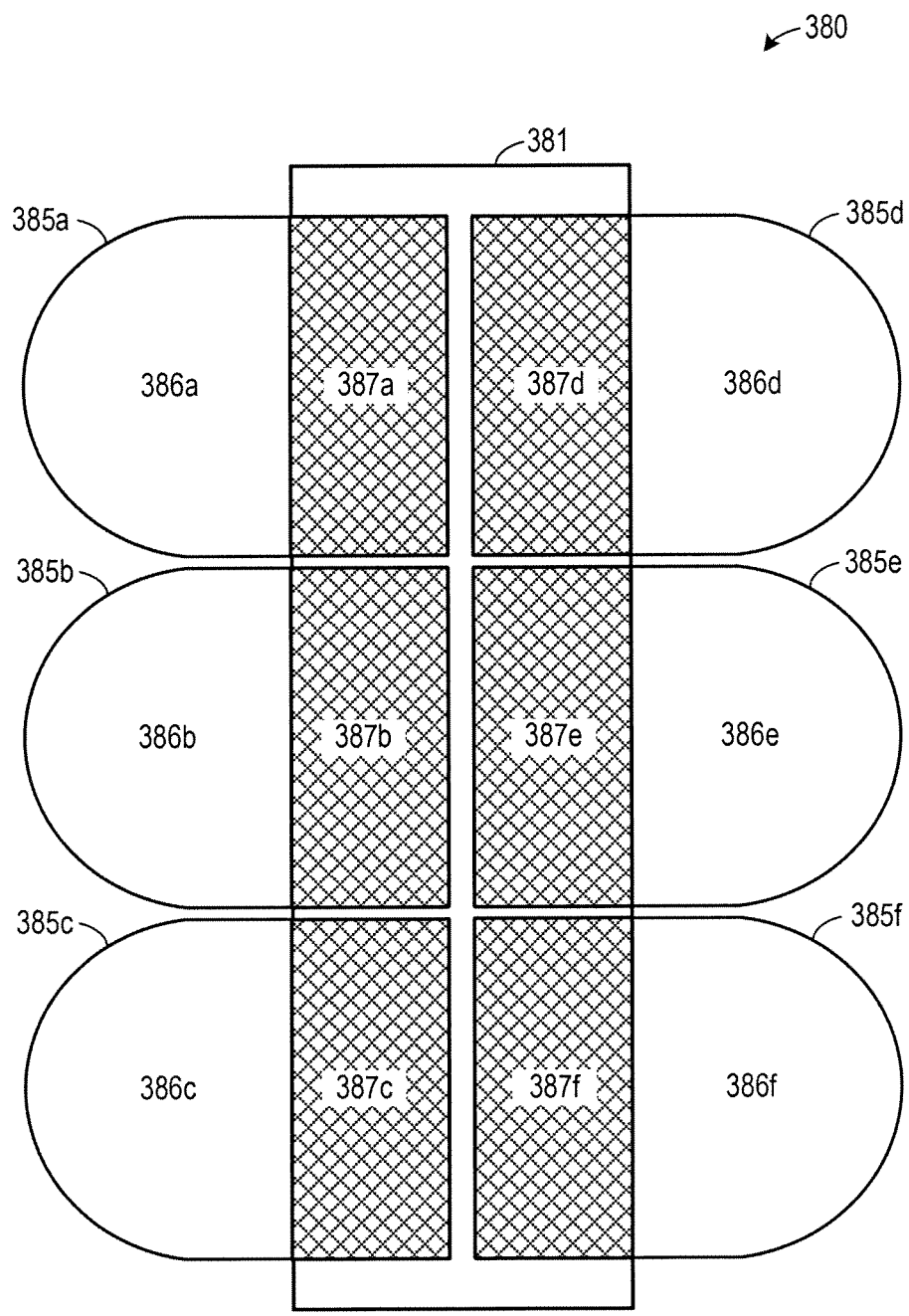
FIG. 3B illustrates a set of six under-bezel tabs, according to an alternative embodiment.

FIG. 3B illustrates a set 380 of six under-bezel tabs 385a-f, according to an alternative embodiment. As illustrated, securing portions 386a-f of each of under-bezel tabs 385a-f may be more rounded than those exemplified in FIG. 3A. The exact length, width, thickness, and shape of securing portions 386a-f and adhering portions 387a-f may be adapted to suit a particular application. For example, the shape and dimensions of securing portions 386a-f may be adapted to accommodate a specific bezel configuration for a particular display or display type. Again, each of adhering portions 387a-f may include an adhesive adapted to selectively secure the corresponding under-bezel tab 385a-f to a display cover. Each under-bezel tab 385a-f may be selectively secured to a display cover permanently or temporarily. Release liner 381 may protect the adhesive coating each adhering portion 387a-f until it is adhered to a display cover.

Figure 3C:
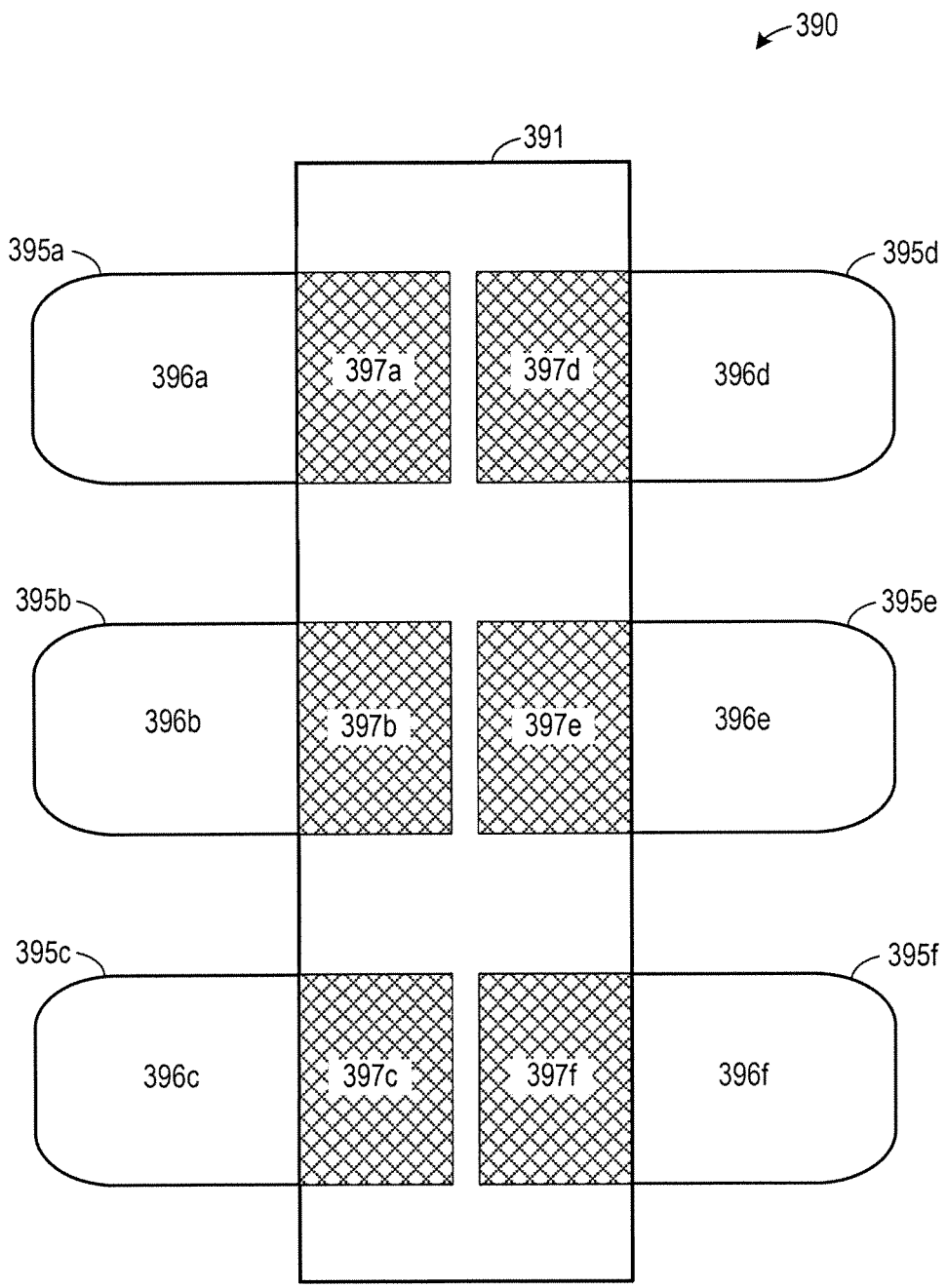
FIG. 3C illustrates a set of six under-bezel tabs, according to another alternative embodiment.

FIG. 3C illustrates another alternative embodiment of a set 390 of six under-bezel tabs 395a-f. Again, each under bezel tab 395a-f may include an adhering portion 397a-f coated on at least one side with an adhesive. The adhesive portion may be secured to a release liner 391 until it is adhered to a display cover. Each under bezel tab 395a-f may also include a securing portion 396a-f configured to be secured between a display and the bezel of a display. As described in greater detail below, securing portions 396a-f may be configured to be secured within slots in a bezel specifically designed to receive an under-bezel tab 395a-f. Alternatively, securing portions 396a-f may be configured to be wedged between a small gap (or create a small gap) between a bezel and a display.

According to any of the embodiments described in conjunction with FIGS. 3A-3C, a set of under-bezel tabs may include any number of under-bezel tabs and is not limited to six under-bezel tabs. For example, a set of under bezel tabs may include only a single under-bezel tab or ten under-bezel tabs. Moreover, the shape and dimensions of each under-bezel tab in a set of under-bezel tabs may vary. For instance, a set of under-bezel tabs may include subsets of under-bezel tabs of having a particular shape or size. According to such an embodiment, a set of under-bezel tabs may include a sufficient number and variety of under-bezel tabs to accommodate any of a wide variety of display cover and display combinations.

Figure 4:
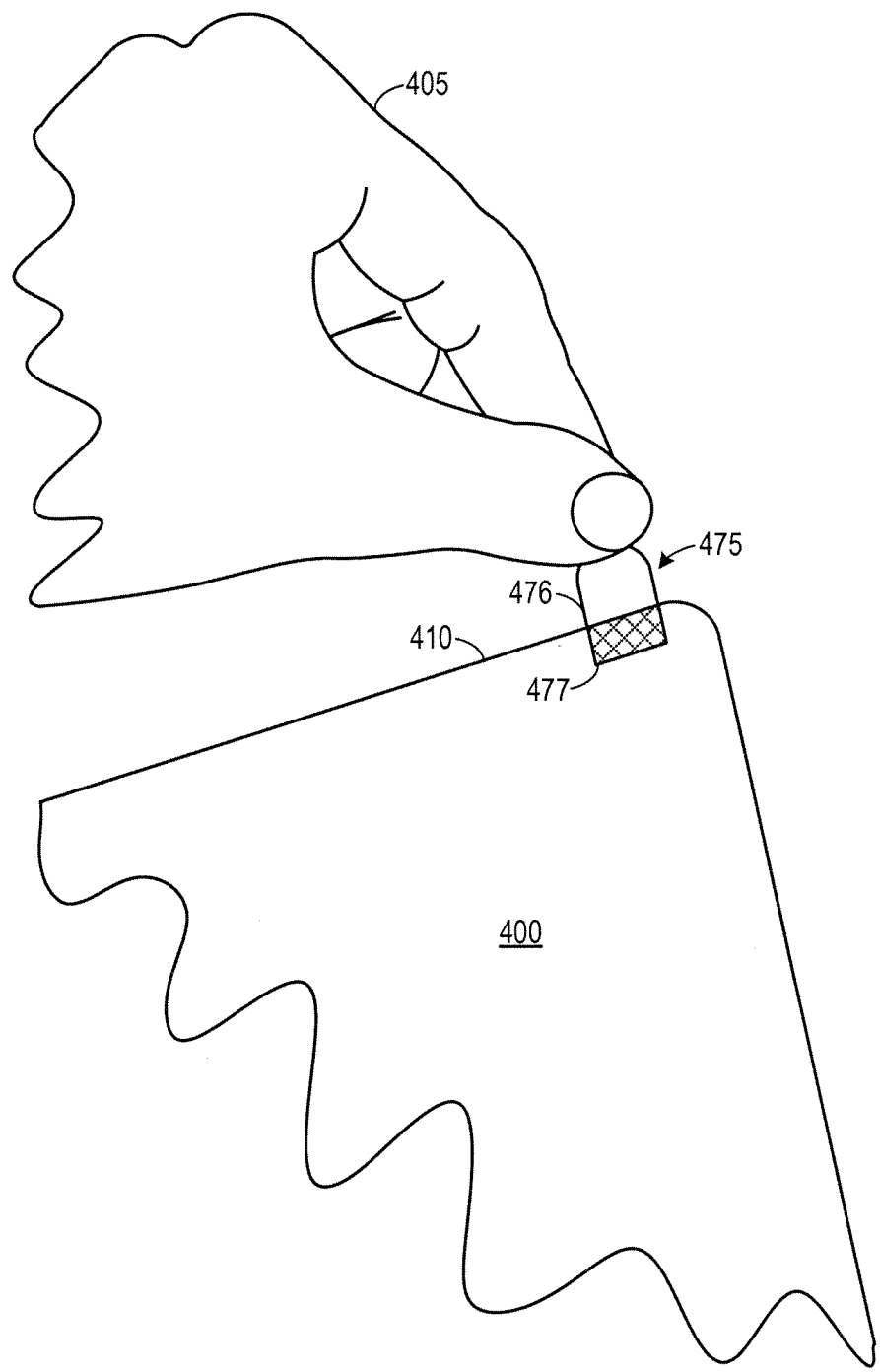
FIG. 4 illustrates a user selectively adhering one end of an exemplary under-bezel tab to an edge of a display cover.
Figure 5A:
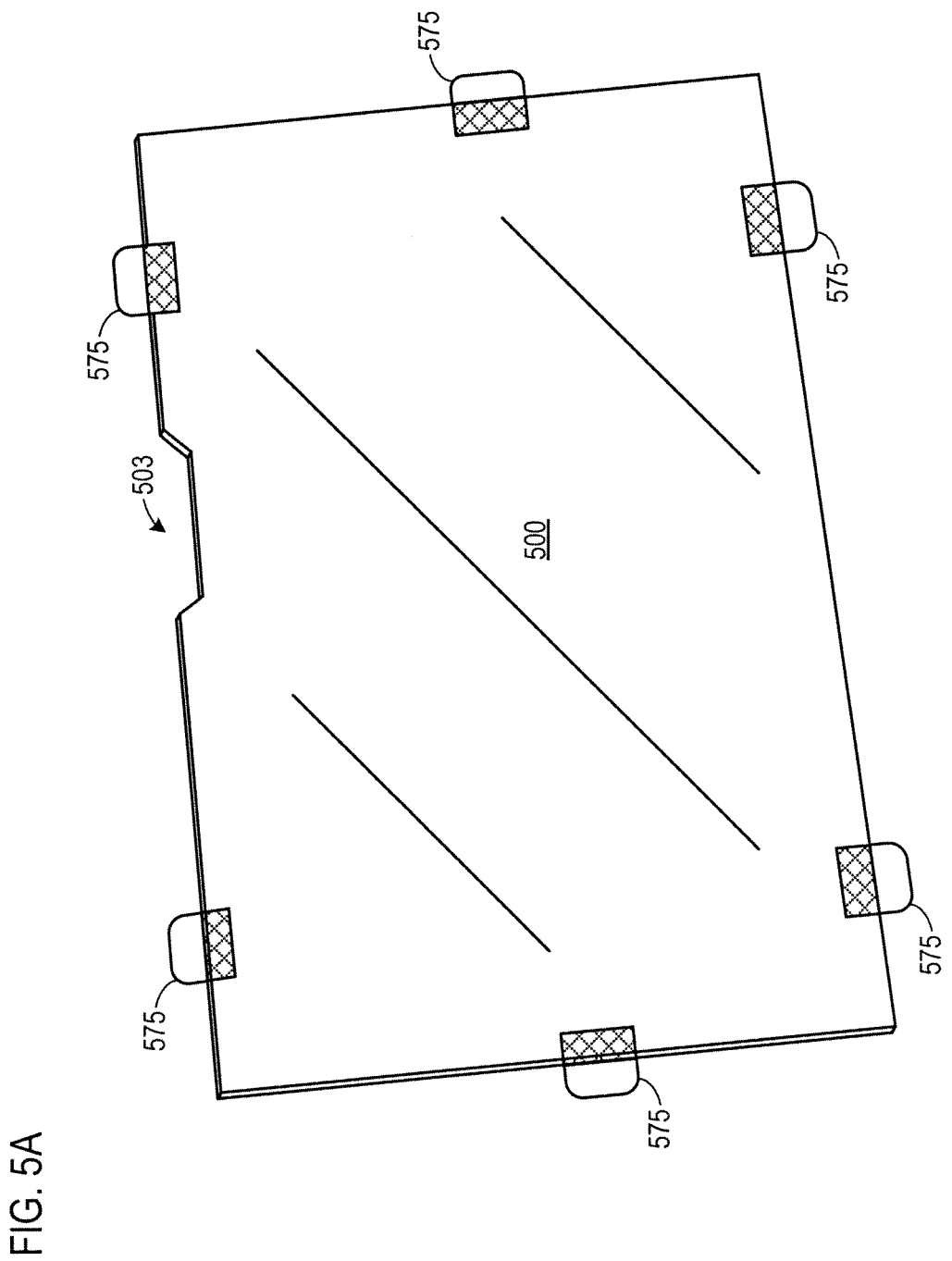
FIG. 5A illustrates a display cover configured with six selectively attachable under-bezel tabs adhered in various locations.

FIG. 4 illustrates a user hand 405 selectively adhering an adhering portion 477 of an exemplary under-bezel tab 475 adjacent an edge 410 of a display cover 400. As illustrated, user hand 405 may grip under-bezel tab 475 by securing portion 476 while the adhesive coating one face of adhering portion 477 is used to adhere under-bezel tab 475 to display cover 400. Under-bezel tab 475 may be positioned at any location on display cover 400. It may be desirable to strategically adhere under-bezel tab 475 to display cover 400 at a location corresponding to a slot or other feature formed in a bezel of a display FIG. 5A illustrates a display cover 500 configured with six selectively attachable under-bezel tabs 575 adhered adjacent edges of display cover 500. As illustrated, display cover 500 may include a notch 503 configured to facilitate user handling and/or ensure proper orientation of display cover 500. In some embodiments, additional notches may be included, notch 503 may be omitted, the size of notch 503 may be changed, and/or the location of notch 503 may be modified. As in previous embodiments, display cover 500 may be configured to protect a display, shift a color of a display, dim a display, polarize a display, reduce glare from a display, provide a privacy screen for a display, and/or otherwise modify or protect a display. Display cover 500 may be manufactured using any of a wide variety of materials, including plastics, metals, resins, ceramics, and glasses.

Under bezel tabs 575 may each include a securing portion and an adhering portion. An adhesive (shown in cross hatches) may be used to selectively secure each under bezel tab 575 adjacent an edge of display cover 500. Any of a wide variety of adhesives may be used, including solvent based adhesives, polymer dispersion adhesives, emulsion adhesives, contact adhesives, hot adhesives, reactive adhesives, and pressure sensitive adhesives.

The shape, size, thickness, and dimensions of under-bezel tabs 575 may be adapted to suit a particular need, bezel configuration, or display type. Under-bezel tabs 575 may be adhered to the front surface of display cover 500 or the rear surface of display cover 500. In some embodiments, an under bezel tab 575 may be configured with a split adhering portion configured with a front portion and a rear portion, the front portion configured to be adhered to a front surface of display cover 500 and the rear portion configured to be adhered to a rear surface of display cover 500.

Figure 5B:
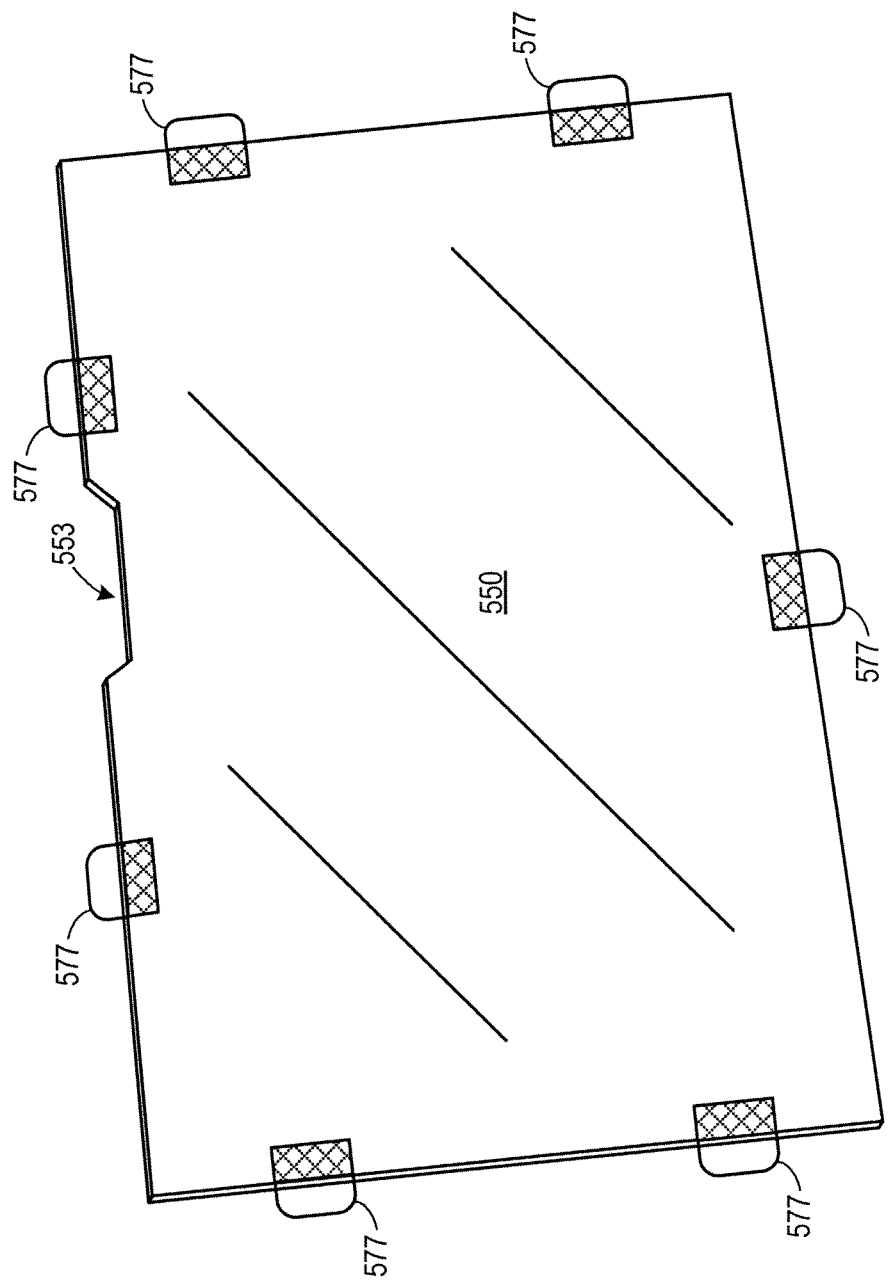
FIG. 5B illustrates a display cover configured with seven selectively attachable under-bezel tabs adhered in various alternative locations.

FIG. 5B illustrates a display cover 550 configured with seven selectively attachable under-bezel tabs 577 adhered in various alternative locations. As illustrated, display cover 550 may include a notch 553. In alternative embodiments, notch 553 may be omitted or modified as is suitable for a particular application. The number and location of each of under-bezel tabs 577 may correspond to the configuration of a bezel surrounding a display. For example, a bezel may include strategically positioned slots configured to receive a securing portion of each of under-bezel tabs 577.

Again, display cover 550 may be configured to protect a display, shift a color of a display, dim a display, polarize a display, reduce glare from a display, provide a privacy screen for a display, and/or otherwise modify or protect a display. Display cover 550 may be manufactured using any of a wide variety of materials, including plastics, metals, resins, ceramics, and glasses. Moreover, under bezel tabs 577 may each include a securing portion and an adhering portion. An adhesive (shown in cross hatches) may be used to selectively secure each under bezel tab 577 adjacent an edge of display cover 550. Any of a wide variety of adhesives may be used, including solvent based adhesives, polymer dispersion adhesives, emulsion adhesives, contact adhesives, hot adhesives, and pressure sensitive adhesives. The shape, size, thickness, and dimensions of under-bezel tabs 577 may be adapted to suit a particular need, bezel configuration, or display type. Under-bezel tabs 577 may be adhered to the front surface of display cover 550 or the rear surface of display cover 550.

Figure 6A:
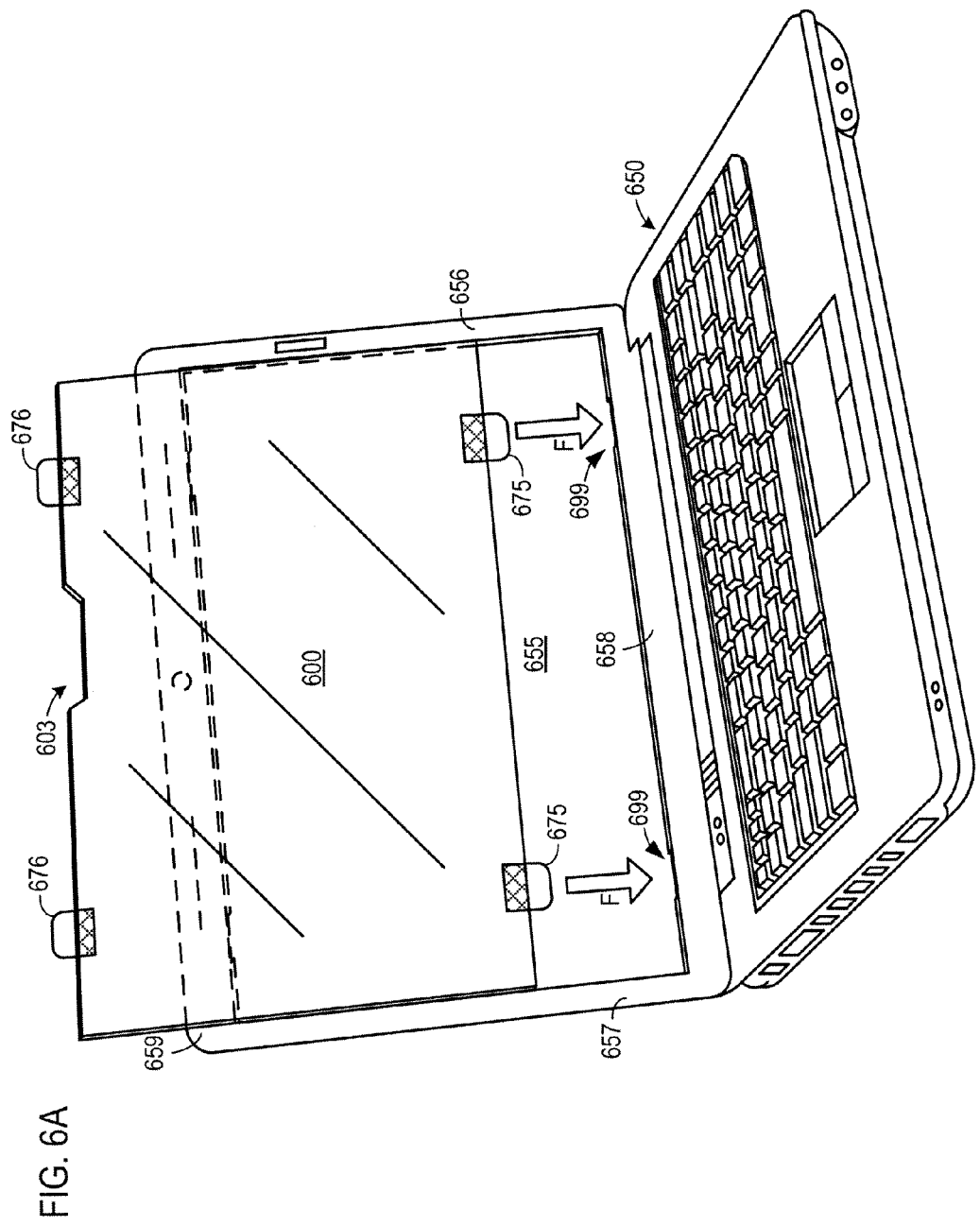
FIG. 6A illustrates a display cover configured with four selectively attachable under-bezel tabs, as the display cover is positioned on a display of a laptop computer.

FIG. 6A illustrates a display cover 600 configured with four selectively attachable under-bezel tabs 675 and 676, as it is positioned in front of a display 655 of a laptop computer 650. As illustrated, display cover 600 may include a notch 603. Display cover 600 may be configured to protect a display, shift a color of a display, dim a display, polarize a display, reduce glare from a display, provide a privacy screen for a display, and/or otherwise modify or protect a display. Display cover 600 may be manufactured using any of a wide variety of materials, including plastics, metals, resins, ceramics, and glasses.

Under bezel tabs 675 and 676 may each include a securing portion and an adhering portion. An adhesive (shown in cross hatches) may be used to selectively secure each under bezel tab 675 and 676 adjacent an edge of display cover 600. Any of a wide variety of adhesives may be used, including solvent based adhesives, polymer dispersion adhesives, emulsion adhesives, contact adhesives, hot adhesives, and pressure sensitive adhesives. The shape, size, thickness, and dimensions of under-bezel tabs 675 and 676 may be a universal configuration or configured specifically for display 655 of laptop computer 650. Under-bezel tabs 675 and 676 may be adhered to the front surface of display cover 600 or the rear surface of display cover 600.

Display 655 may be surrounded by four bezel sections 656, 657, 658, and 659. Each bezel section 656, 657, 658, and 659 may include one or more slots 699. As illustrated, top bezel 659 includes two slots (not numbered for clarity) and bottom bezel 658 includes two slots 699. According to various alternative embodiments, side bezels 656 and 657 may include one or more slots as well. Under-bezel tabs 675 and 676 may be adhered adjacent edges of display cover 600 in locations corresponding to slots 699. Accordingly, display cover 600 may be brought downward in the direction of arrows F until the securing portion of under-bezel tabs 675 enter slots 699.

Figure 6B:
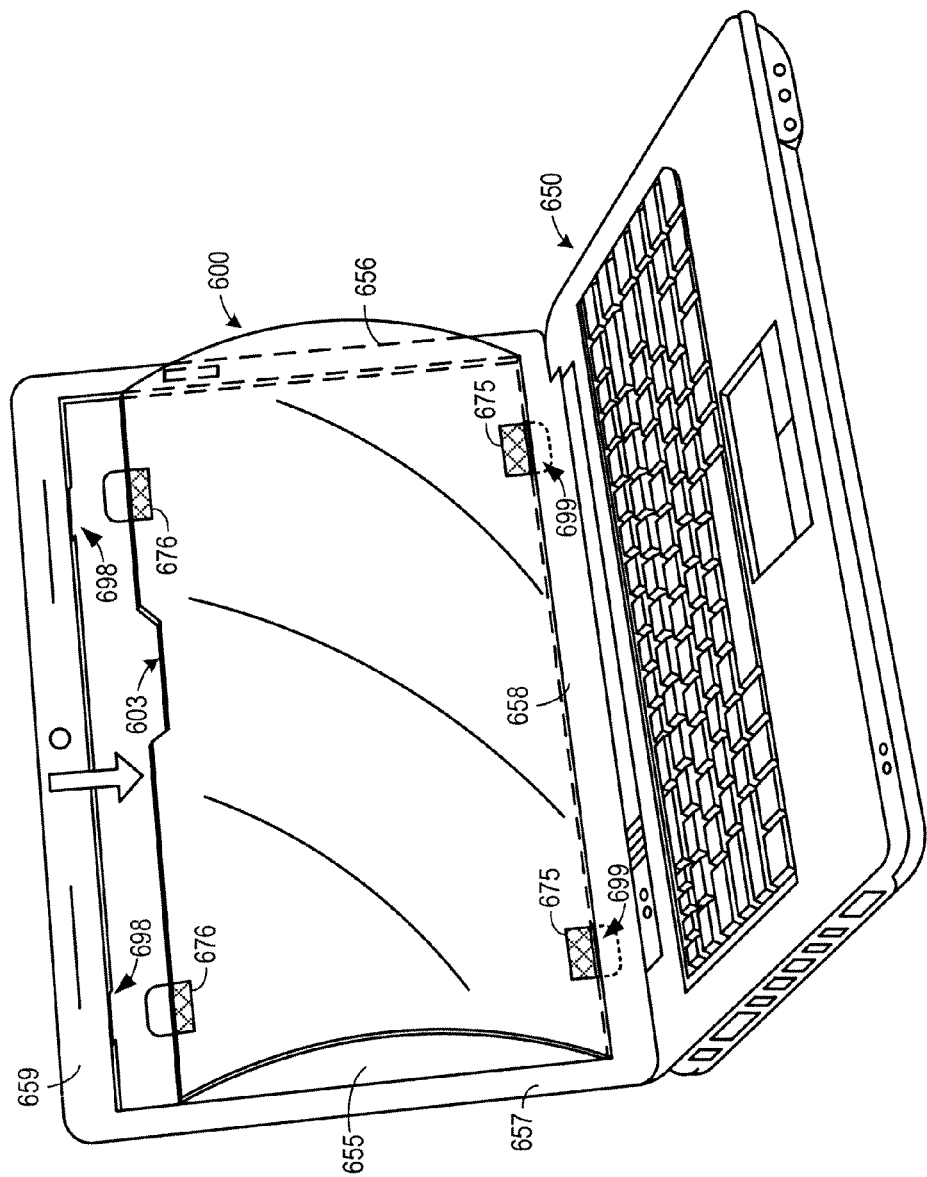
FIG. 6B illustrates two under-bezel tabs secured within slots in a bezel of the display, with the display cover bent in order to insert the remaining under-bezel tabs.

FIG. 6B illustrates two under-bezel tabs 675 secured within slots 699 in lower bezel section 658 of display 655. As illustrated, display cover 600 may be bent slightly in order to position under-bezel tabs 676 within slots 698 in top bezel 659. In an alternative embodiment, one or more sections 656, 657, 658, and 659 of the bezel may be selectively pivoted, removed, and/or otherwise allow display cover 600 to be positioned in front of display 655 of laptop computer 650.

Figure 6C:
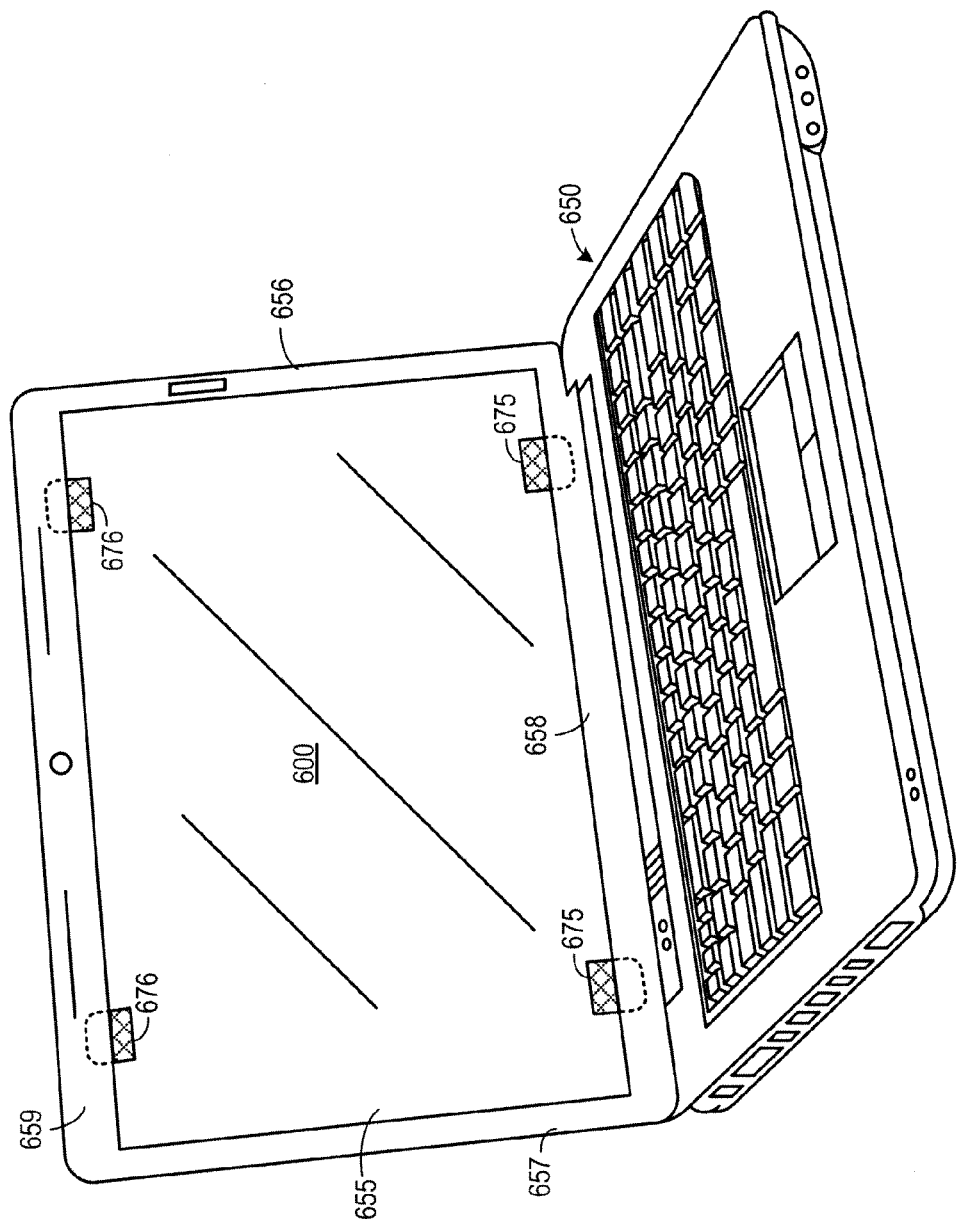
FIG. 6C illustrates the display cover secured to the bezel of the display of the laptop computer via the four under-bezel tabs.

FIG. 6C illustrates display cover 600 secured in front of display 655 of laptop computer 650 via under-bezel tabs 675 and 676. As illustrated, the securing portions (shown in dashed lines) of under-bezel tabs 675 and 676 may be configured to selectively secure display cover 600 in front of display 655 The adhering portion of each under-bezel tab 675 and 676 may include an adhesive (shown in cross hatches) configured to selectively secure under-bezel tabs 675 and 676 to display cover 600. The adhesive may secure the under-bezel tabs 675 and 676 permanently or temporarily. Additionally, the adhesive and/or the adhering portion of each under-bezel tab 675 and 676 may have any shape, dimension, or thickness as is deemed appropriate for a particular application. In some embodiments, the adhesive and/or the adhering portion of each under-bezel tab 675 and 676 may be transparent or match the coloring and shading of display cover 600.

In the illustrated embodiment, four under-bezel tabs 675 and 676 are used and correspond in number and location to slots 698 and 699 (FIG. 6B). In alternative embodiments, any number of under-bezel tabs may be utilized and positioned to any number of corresponding slots formed in a bezel of a display. Moreover, in some embodiments, under-bezel tabs may be adapted to be forced between a bezel and a display that does not included pre-formed slots configured for such a purpose. In such an embodiments, any number of under-bezel tabs may be used as is deemed necessary or useful.

FIG. 7A illustrates a bottom view of a tapered under-bezel tab 775, including a securing portion 776 and an adhering portion 777, according to one exemplary embodiment. Securing portion 776 may be configured to enter a slot formed in a bezel of a display, or alternatively be configured to be positioned between a display and a bezel. Securing portion 776 may be any shape, size, dimension, and/or thickness. Additionally, as illustrated in FIG. 7B, securing portion 776 may include a tapered profile having a diminishing thickness at the edge. Such a taper may facilitate the insertion of securing portion 776 between a bezel and a display surface. In some embodiments, securing portion 776 and/or adhering portion 777 may include a tapered profile that is substantially planar. Alternatively, securing portion 776 and/or adhering portion 777 may be substantially planar and include one or more protrusions or intrusions configured to interact with a display, a bezel, and/or a display panel.

As illustrated in FIG. 7B, an adhesive 778 may be configured to coat the underside of adhering portion 777. In alternative embodiments, adhesive 778 may be configured to coat the top side of adhering portion 777. Adhesive 778 may be configured to secure adhering portion 777 permanently, semi-permanently, for a fixed time period, or temporarily. Any of a wide variety of adhesives may be used, including solvent based adhesives, polymer dispersion adhesives, emulsion adhesives, contact adhesives, hot adhesives, and pressure sensitive adhesives. For example, a removable pressure sensitive adhesive may be employed that could allow under-bezel tab 775 to be selectively removed from a display cover months or even years after its initial adhesion.

Figure 7C:
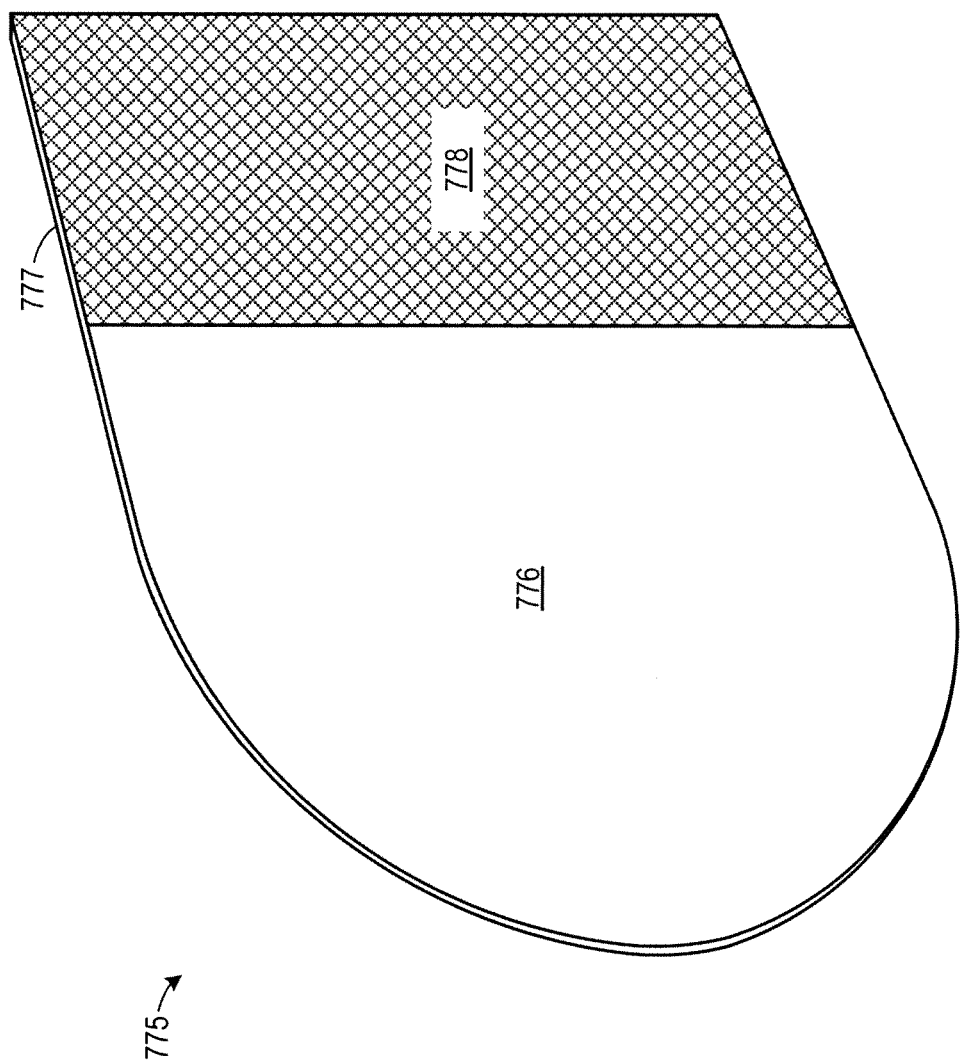
FIG. 7C illustrates a perspective view of the under-bezel tab, including the securing portion and the adhering portion, according to one exemplary embodiment.

FIG. 7C illustrates a perspective view of under-bezel tab 775, including securing portion 776 and adhering portion 777. As illustrated, adhesive 778 may coat an entire face of adhering portion 777. In alternative embodiments, adhesive 778 may coat only a portion of adhering portion 777. Under-bezel tab 775 may be configured with any of a wide variety of thicknesses, shapes, sizes, and general dimensions. The illustrated embodiments are merely representative. For example, under-bezel tab 775 may be configured with a generally rectangular shape, rather than the rounded nose of securing portion 776.

Additionally, the thicknesses of securing portion 776 and adhering portion 777 may not be the same, nor need securing portion 776 and adhering portion 777 lie in the same plane. A middle portion, as illustrated in FIGS. 8A-8C, may adjust the elevation of the planar surface of the adhering portion 777 with respect to the planar surface of the securing potion 776.

FIG. 8A illustrates a side profile view of an exemplary under-bezel tab 875 secured to the top surface of a display cover 800. As illustrated, under-bezel tab 875 may include a securing portion 876, an adhering portion 877, and an adhesive 878 coating at least a portion of the face of adhering portion 877. As illustrated, adhesive 878 may secure adhering portion 877 to an upper surface of display cover 800. Securing portion 876 may lie in the same general plane as adhering portion 877. The thicknesses of securing portion 876 and adhering portion 877 may be the same, or different. Accordingly to various embodiments, the thickness of under-bezel tab 875, including adhering portion 877, adhesive 878, and securing portion 876, may be less than the thickness of display cover 800.

FIG. 8B illustrates a side profile view of an alternative, under-bezel tab 885 secured to the top surface of display cover 800. In the illustrated embodiment, a step-down middle portion 889 is configured to adjust the elevation of the planar surface of securing portion 886 of under-bezel tab 885 relative to adhering portion 887. Step-down middle portion 889 may be configured to adjust the elevation such that a surface of securing portion 886 is coplanar with a surface of display cover 800, centered within the thickness of display cover 800, or at any other planar elevation with respect to a surface of display cover 800.

Similar to previously described embodiments, adhesive 878 may include any of a wide variety of adhesives, such as solvent based adhesives, polymer dispersion adhesives, emulsion adhesives, contact adhesives, hot adhesives, and pressure sensitive adhesives. In some embodiments, securing portion 886 and/or adhering portion 887 may include a tapered profile that is substantially planar. Alternatively, securing portion 886 and/or adhering portion 887 may be substantially planar and include one or more protrusions or intrusions configured to interact with a display, a bezel, and/or a display panel.

FIG. 8C illustrates a side profile view of an under-bezel tab 895 secured to the bottom surface of display cover 800. A securing portion 896 of under-bezel tab 895 may be configured to secure display cover 800 to a bezel of a display. Securing portion 896 may be substantially planar and include a taper in one or more directions. An adhering portion 897 may be adhered to the bottom surface of display cover 800 via an adhesive 878. Adhesive 878 may be any of a wide variety of adhesives. In some embodiments adhering portion 897 may be tapered in one or more directions and/or include a surface texture or coating designed to provide favorable bonding with adhesive 878. Moreover, according to various embodiments, adhering portion 897 and/or adhesive 878 may be transparent and/or correspond to display cover 800.

Figure 9A:
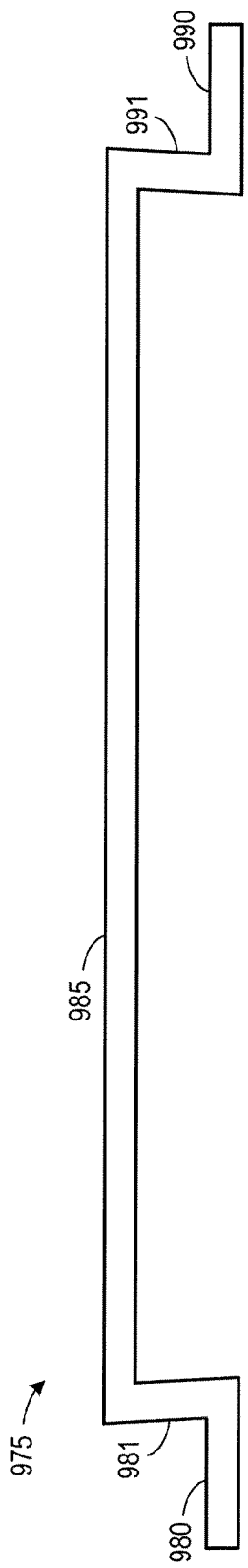
FIG. 9A illustrates an alternative U-shaped under-bezel tab assembly configured to span a surface of a display cover.

FIG. 9A illustrates an alternative U-shaped under-bezel tab assembly 975 configured to span a surface of a display cover. U-shaped under-bezel tab assembly 975 may include a left securing portion 980 and a right securing portion 990. Securing portions 980 and 990 may be substantially planar and include a taper in one or more directions. A U-shaped tension portion 985 may be connected to securing portions 980 and 990 and provide a lateral tension on a display screen at portions 981 and 991. Portions 981 and 991 may be configured to adjusted the elevation, such that a surface of securing portions 980 and 990 is coplanar with a surface of a display cover, centered within the thickness of the display cover, or at any other planar elevation with respect to a surface of a display cover. As illustrated, portions 981 and 991 of U-shaped tension portion 985 may angle in slightly in order to provide additional tension when fitted on a display cover. In some embodiments, U-shaped tension portion 985 may also include an adhesive. U-shaped tension portion 985 may be substantially transparent or match the coloring and shading of a display cover.

Figure 9B:
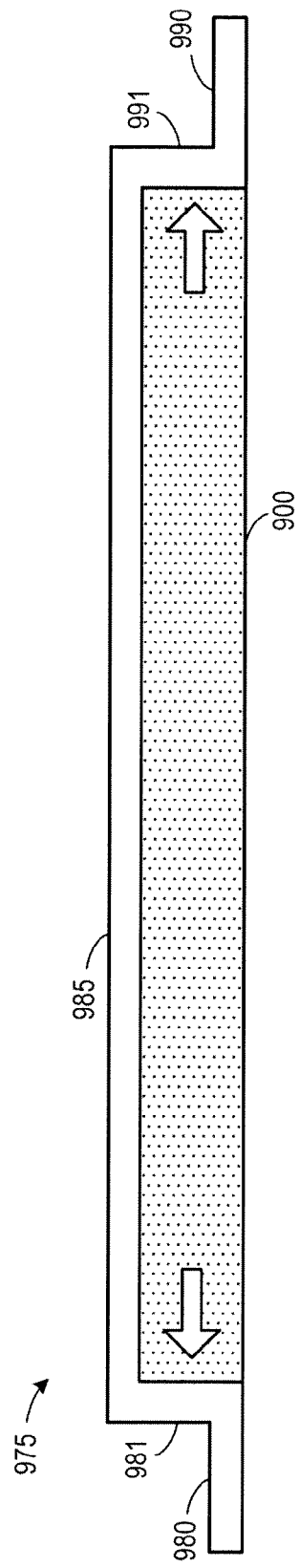
FIG. 9B illustrates a side profile view of the alternative U-shaped under-bezel tab assembly secured to the upper surface of a display cover.

FIG. 9B illustrates a side profile view of the alternative U-shaped under-bezel tab assembly 975 secured to the upper surface of a display cover 900. Arrows near portions 981 and 991 of U-shaped tension portion 985 indicate the lateral force configured to secure U-shaped under-bezel tab assembly 975 to display cover 900. The lateral force may be sufficient to cause portions 981 and 991 of U-shaped tension portion 985 to form right angles with respect to securing portions 980 and 990 and/or the spanning portion of U-shaped tension portion 985.

Figure 9C:
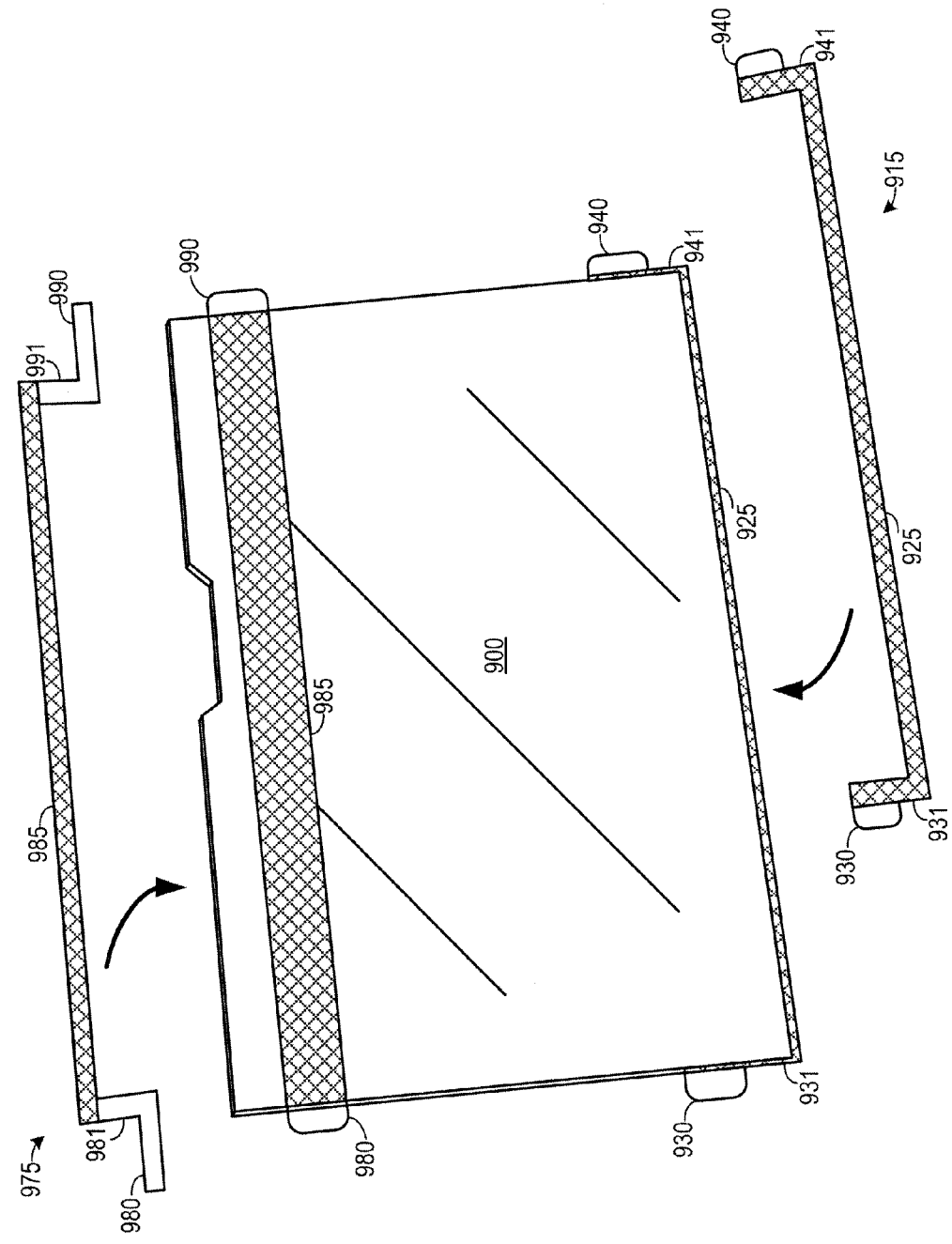
FIG. 9C illustrates a perspective view of two embodiments of U-shaped under-bezel tab assemblies secured to a display cover.

FIG. 9C illustrates a perspective view of two embodiments of U-shaped under-bezel tab assemblies 975 and 915 secured to a display cover 900. As illustrated, a first embodiment of a U-shaped under-bezel tab assembly may be as described in conjunction with FIGS. 9A and 9B. Accordingly, U-shaped tension portion 985 may be fitted across a surface (upper or lower) of display cover 900. The portions 981 and 991 of U-shaped tension portion 985 may provide sufficient tension to secure U-shaped under-bezel tab assembly 975 to display cover 900. According to various embodiments, securing portions 980 and 990 may be fitted within slots in a bezel of a display in order to secure display cover 900 to a surface of the display.

Similarly, a second embodiment of a U-shaped under-bezel tab assembly 915 may include a U-shaped tension portion 925, including portions 931 and 941, and securing portions 930 and 940. U-shaped tension portion 925 may be configured to span the width (or height) of display cover 900 along an edge, as opposed to a top or bottom surface. As illustrated, U-shaped tension portion 925 may not cover any portion of the top or bottom surfaces of display cover 900. Portions 931 and 941 of U-shaped tension portion 925 may provide sufficient tension on the edges of display cover 900 to secure U-shaped under-bezel tab assembly 915 to display cover 900. Securing portions 930 and 940 may be fitted within slots in a bezel of a display in order to secure display cover 900 in place.

The above description provides numerous specific details for a thorough understanding of the embodiments described herein. However, those of skill in the art will recognize that one or more of the specific details may be omitted or combined with those of another embodiment. Additionally, various methods, components, or materials may be used. In some cases, operations are not shown or described in detail.

What is claimed:

1. An apparatus for securing a display cover to an electronic display of a computer, comprising:
    an under-bezel tab configured to selectively secure a display cover to a display, the under-bezel tab comprising:
        a first end configured to be selectively adhered adjacent an edge of the display cover, the first end having a substantially planar surface and a thickness less than that of the display cover; and
        a second end configured to be secured between a display surface of the display and a bezel of the display, the second end having a substantially planar surface and a thickness less than that of the display cover; and
    an adhesive configured to removably adhere the first end of the under-bezel tab adjacent the edge of the display cover, the adhesive having a thickness less than that of the display cover,
    wherein the under-bezel tab can be selectively removed from the display cover and replaced at any location on the display cover.

2. The apparatus for securing a display cover to a display of claim 1, wherein the under-bezel tab further comprises a step-down middle portion configured to adjust an elevation of the substantially planar surface of the first end of the under-bezel tab with respect to the substantially planar surface of the second end of the under-bezel tab.

3. The apparatus for securing a display cover to a display of claim 1, wherein the second end of the under-bezel tab is tapered.

4. The apparatus for securing a display cover to a display of claim 1, wherein the second end of the under-bezel tab is the same thickness as the first end of the under-bezel tab.

5. The apparatus for securing a display cover to a display of claim 1, wherein the second end of the under-bezel tab is configured to be secured within a slot formed in the bezel of the display.

6. The apparatus for securing a display cover to a display of claim 1, wherein the first end of the under-bezel tab is configured to be selectively adhered to an upper face of the display cover adjacent the edge of the display cover.

7. The apparatus for securing a display cover to a display of claim 1, wherein the adhesive comprises one of a solvent based adhesive, a polymer dispersion adhesive, an emulsion adhesive, a contact adhesive, a hot adhesive, a reactive adhesive, and a pressure sensitive adhesive.

8. The apparatus for securing a display cover to a display of claim 1, further comprising a plurality of under-bezel tabs, each under bezel tab comprising:
    a first end configured to be selectively adhered adjacent an edge of the display cover, the first end having a substantially planar surface and a thickness less than that of the display cover; and
    a second end configured to be secured between a display surface of the display and a bezel of the display, the second end having a substantially planar surface and a thickness less than that of the display cover; and
    an adhesive configured to selectively adhere the first end of the under-bezel tab adjacent the edge of the display cover, the adhesive having a thickness less than that of the display cover.

9. A set of under-bezel tabs for securing a display cover to an electronic display of a computer, comprising:
    a plurality of under-bezel tabs configured to selectively secure a display cover to a display, each under-bezel tab comprising:

a first end configured to be selectively adhered adjacent an edge of the display cover, the first end having a substantially planar surface and a thickness less than that of the display cover;

a second end configured to be secured between a display surface of the display and a bezel of the display, the second end having a substantially planar surface and a thickness less than that of the display cover; and an adhesive coating an underside of the first end of the under-bezel tab configured to removably adhere the first end of the under-bezel tab adjacent the edge of the display cover, the adhesive having a thickness less than that of the display cover; and a release liner configured to selectively line the adhesive coating the first end of each of the plurality of under-bezel tabs, wherein each of the under-bezel tabs can be selectively removed from the display cover and replaced at any location on the display cover.

10. The set of under-bezel tabs of claim 9, wherein each of the under-bezel tabs further comprises a step-down middle portion configured to adjust an elevation of the substantially planar surface of the first end of the under-bezel tab with respect to the substantially planar surface of the second end of the under-bezel tab.

11. The set of under-bezel tabs of claim 9, wherein the second end of each under-bezel tab is tapered.

12. The set of under-bezel tabs of claim 9, wherein the second end of each under-bezel tab is the same thickness as the first end of each under-bezel tab.

13. The set of under-bezel tabs of claim 9, wherein the second end of each under-bezel tab is configured to be secured within a corresponding slot formed in the bezel of the display.

14. The set of under-bezel tabs of claim 9, wherein the first end of each under-bezel tab is configured to be selectively adhered to an upper face of the display cover adjacent the edge of the display cover.

15. The set of under-bezel tabs of claim 9, wherein the adhesive comprises one of a solvent based adhesive, a polymer dispersion adhesive, an emulsion adhesive, a contact adhesive, a hot adhesive, a reactive adhesive, and a pressure sensitive adhesive.

16. A display cover adapted to be secured under a bezel of an electronic display of a computer, comprising:

a display cover having a first planar surface and a second planar surface, the display cover configured to be positioned adjacent a planar surface of a display;

a plurality of under-bezel tabs, each under bezel tab comprising:

a first end configured to be selectively adhered adjacent an edge of the display cover, the first end having a substantially planar surface and a thickness less than that of the display cover; and a second end configured to be secured between a display surface of the display and a bezel of the display, the second end having a substantially planar surface and a thickness less than that of the display cover; and an adhesive configured to removably adhere the first end of the under-bezel tab adjacent the edge of the display cover, the adhesive having a thickness less than that of the display cover, wherein the plurality of under-bezel tabs are configured to selectively maintain the display cover positioned adjacent the planar surface of the display, and wherein the under-bezel tab can be selectively removed from the display cover and replaced at any location on the display cover.

17. The display cover of claim 16, wherein each of the under-bezel tabs further comprises a step-down middle portion configured to adjust an elevation of the substantially planar surface of the first end of the under-bezel tab with respect to the substantially planar surface of the second end of the under-bezel tab.

18. The display cover of claim 16, wherein the second end of each under-bezel tab is tapered.

19. The display cover of claim 16, wherein the second end of each under-bezel tab is the same thickness as the first end of each under-bezel tab.

20. The display cover of claim 16, wherein the second end of each under-bezel tab is configured to be secured within a corresponding slot formed in the bezel of the display.

21. The display cover of claim 16, wherein the first end of each under-bezel tab is configured to be selectively adhered to an upper face of the display cover adjacent the edge of the display cover.

22. The display cover of claim 16, wherein the adhesive comprises one of a solvent based adhesive, a polymer dispersion adhesive, an emulsion adhesive, a contact adhesive, a hot adhesive, a reactive adhesive, and a pressure sensitive adhesive.

* * * * *